United States Patent
Watson et al.

(10) Patent No.: US 9,699,519 B2
(45) Date of Patent: Jul. 4, 2017

(54) PARTITIONING STREAMING MEDIA FILES ON MULTIPLE CONTENT DISTRIBUTION NETWORKS

(71) Applicant: NETFLIX, Inc., Los Gatos, CA (US)

(72) Inventors: Mark Watson, San Francisco, CA (US); Neil D. Hunt, Los Altos, CA (US); John Funge, Sunnyvale, CA (US); Anthony N. Park, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 588 days.

(21) Appl. No.: 13/654,301

(22) Filed: Oct. 17, 2012

(65) Prior Publication Data

US 2014/0108671 A1 Apr. 17, 2014

(51) Int. Cl.
*G06F 15/16* (2006.01)
*G06F 15/173* (2006.01)
*G06F 13/00* (2006.01)
*H04N 21/658* (2011.01)
*H04L 29/06* (2006.01)
*H04N 21/231* (2011.01)
(Continued)

(52) U.S. Cl.
CPC ..... *H04N 21/6581* (2013.01); *H04L 65/4084* (2013.01); *H04L 67/322* (2013.01); *H04N 21/23106* (2013.01); *H04N 21/23116* (2013.01); *H04N 21/26258* (2013.01); *H04N 21/44209* (2013.01); *H04L 67/10* (2013.01)

(58) Field of Classification Search
CPC ......... H04L 47/10; H04L 49/90; H04L 29/06; H04L 49/901; H04L 41/0213; H04L 29/08072; H04L 41/22; H04L 41/12; H04Q 11/0478; H04N 21/482; H04N 5/4401; H04N 5/44543; H04N 5/50; H04N 5/46
USPC ........................................................ 709/234
See application file for complete search history.

(56) References Cited

U.S. PATENT DOCUMENTS 7,260,598 B1    8/2007   Liskov et al.
9,264,780 B1 *   2/2016   Stoica ................. H04L 67/1095
(Continued)

FOREIGN PATENT DOCUMENTS

CN      1981504 A     6/2007

OTHER PUBLICATIONS

International Search Report for PCT Application No. PCT/US13/64878 dated Apr. 24, 2014.
(Continued)

*Primary Examiner* — Mahran Abu Roumi
(74) *Attorney, Agent, or Firm* — Artegis Law Group, LLP (57) ABSTRACT

Techniques are disclosed for generating preference rankings in response to requests for streaming media content received from client devices. The preference rankings are used to indirectly partition streaming media content across different content distribution networks (CDNs). Such partitions may be referred to as a "soft" partition, as all of the streaming media content remains available from each CDN. That is, the partitioning of content across CDNs is not absolute, and any content item may be requested from any CDN. Doing so ensures that content remains available even where the preferred CDN for a given content item fails, while at the same time increasing the probability of a cache hit at the CDNs, without increasing the cost or the actual cache sizes of the content caches of different CDNs.

25 Claims, 9 Drawing Sheets

(51) Int. Cl.
*H04N 21/442* (2011.01)
*H04N 21/262* (2011.01)
*H04L 29/08* (2006.01)

(56) References Cited

U.S. PATENT DOCUMENTS

| | | | |
|---|---|---|---|
| 2003/0204602 A1* | 10/2003 | Hudson | D01D 5/423 709/228 |
| 2004/0163123 A1* | 8/2004 | Okada | H04N 7/173 725/116 |
| 2008/0147837 A1* | 6/2008 | Klein | H04L 29/12066 709/223 |
| 2008/0215718 A1* | 9/2008 | Stolorz | H04L 61/1511 709/223 |
| 2010/0251313 A1* | 9/2010 | Mao | H04N 21/222 725/98 |
| 2011/0016225 A1* | 1/2011 | Park | H04N 21/44209 709/234 |
| 2011/0019632 A1 | 1/2011 | Walker et al. | |
| 2011/0107030 A1* | 5/2011 | Borst | H04N 21/23106 711/118 |
| 2011/0197227 A1* | 8/2011 | Rouse | H04N 21/25891 725/38 |
| 2011/0219109 A1 | 9/2011 | Zehavi et al. | |
| 2011/0239078 A1* | 9/2011 | Luby | H04N 21/23106 714/752 |
| 2012/0002717 A1* | 1/2012 | Ma | H04N 21/44209 375/240.01 |
| 2012/0047542 A1* | 2/2012 | Lewis | H04N 21/44016 725/97 |
| 2012/0226734 A1 | 9/2012 | Poese et al. | |
| 2013/0219449 A1* | 8/2013 | Muvavarirwa | H04N 21/43615 725/139 |
| 2013/0275610 A1* | 10/2013 | Mahajan | H04N 21/23106 709/231 |
| 2014/0075042 A1* | 3/2014 | Giladi | H04L 65/605 709/231 |

OTHER PUBLICATIONS

Extended European Search Report Application No. 13847676.7, dated May 23, 2016, 10 pages.
Vijay Kumar Adhikari et al: "Unreeling netflix: Understanding and improving multi-CON movie delivery", INFOCOM, 2012 Proceedings IEEE, IEEE, Mar. 25, 2012 (Mar. 25, 2012), pp. 1620-1628, XP032178892, DOI: 10.1109/INFOCOM.2012.6195531 ISBN: 978-1-4673-0773-4 * p. 1620, paragraph I * *p. 1621, right-hand column, line 15, paragraph II—p. 1622, right-hand column, line 5 * * figures 3, 4 * * p. 1626, paragraph IV—p. 1628 *.
George Pallis et al: "Insight and perspectives for content delivery networks", Communications of the ACM, vol. 49, No. I, Jan. 1, 2006 (Jan. 1, 2006), pp. 101-106, XP055110865, ISSN: 0001-0782, DOI: 10.1145/1107458.1107462 * the whole document *.
Watson, et al., "DASH: Support for multiple CDNs", Torino, Italy, ISO/IEC JTC1/SC29/WG11, MPEG 2010, M21328 v3, Jul. 2011, 4 pages.

* cited by examiner

PARTITIONING STREAMING MEDIA FILES ON MULTIPLE CONTENT DISTRIBUTION NETWORKS

BACKGROUND OF THE INVENTION

Field of the Invention

Embodiments of the invention generally relate to streaming media services. More specifically, embodiments of the invention relate to techniques for partitioning streaming media files hosted on multiple content distribution networks.

Description of the Related Art

A streaming media service generally allows users to consume media content on-demand over a data communications network. The service provider is configured to store (provide access to) media files (or "streams") made available to users. For example, the streaming media service provider may use a variety of distribution networks to host a library of streaming media titles. Each stream may provide a digital version of a feature length film, a television program, a sporting event, a staged or live event captured by recorded video, etc. Streams also include media content created specifically for distribution online.

Media playback by a client device is typically referred as "streaming" because one of the distribution networks is used to transmit portions of a media file to the client device, which in turn decodes and initiates playback without waiting for the complete stream to be received. To account for variable latency and bandwidth within the communications network, a content buffer on the client device queues incoming portions of the stream ahead of portions actually being played. During moments of network congestion (which leads to lower available bandwidth) less data is added to the buffer, which may drain down as data is being de-queued to support playback at a certain playback bit rate. However, during moments of high network bandwidth, the buffer is replenished and additional buffer time is added until the buffer is generally full again.

Streaming encoded audiovisual (AV) programs over the Internet has become popular as the availability of high-bandwidth Internet communication has increased. From a technical standpoint, a variety of different streaming media protocols are available for transmitting media streams to the client. Although many of these protocols were designed to transmit media streams from a server to a conventional computing system, e.g., a typical desktop PC or laptop computer, or home theatre PC (HTPC), the streaming approach is also being used to transmit streaming media to a variety of end-user client devices; including, e.g., mobile telephones, tablet and net-book computing devices, console and handheld video game systems, digital video recorders (DVRs), DVD players, connected digital TVs, and dedicated media streaming devices, (e.g., the Roku® set-top box), etc.

SUMMARY OF THE INVENTION

One embodiment of the present invention includes a computer-implemented method for providing a client device with a streaming media title. This method may generally include receiving a request for the streaming media title from the client device and generating a content distribution network (CDN) preferences list that includes, for each of a plurality of CDNs, one or more links to the streaming media title and that ranks the CDNs in the list by order of preference for streaming the media title to the client device. A ranking associated with at least one of the CDNs is based, at least in part, on one or more characteristics of the streaming media title, e.g., based on a title ID associated with the streaming media title.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A streaming media client device may be able to select from multiple content distribution networks (CDNs) in order to stream media content. For example, after subscriber has authenticated an account with the service provider, a client device may request to stream a given media title. In response, the service provider may send the client a list of links to different CDNs from which the media content may be obtained. The list may be sorted, indicating a preference ranking for each CDN. For example, the service provider may have arrangements with two CDNs that result in 60 percent of the streaming traffic being handled by one CDN, with the remaining 40 by the other. In such a case, the provider could generate preference rankings that give the first CDN a higher preference for 60 percent of streaming requests and give the second CDN a higher preference for 40 percent of streaming requests. The client then selects a CDN based on a combination of the preference rankings and measurements by the client of CDN performance. In an alternative embodiment, each CDN is associated with a weight or probability and the client chooses a CDN according to those probabilities.

Note, in this context a CDN generally refers to a distributed network of computing servers connected locally to the Internet in various locations. That is, a CDN refers to a cluster of one or more content servers connected to the Internet in a manner so as to have actual or potential differences in connectivity from another cluster of content servers, such that using servers from one cluster or the other may result in differential performance opportunities for the streaming client. The server clusters may be operated by a single entity providing streaming services (resulting in multiple virtual CDNs) or operated by multiple service providers independently. Further, such a cluster of servers may be operated by a business entity referred to as a CDN or CDN provider, but need not be.

One result of using different CDN server clusters is that any given title is equally likely to be in the local cache of an edge server of one CDN as it is to be in the local cache of an edge server of another CDN. That is, edge servers in different CDNs will tend to a cache the same subset of content. Presence of content in the local cache of a CDN edge server is advantageous since CDN performance for a given client (and hence potentially user quality of experience) is higher when the content is already available in the local cache. One way to increase the probability of a cache hit is to provide a larger amount of cache storage, but this approach implies additional cost (to provide and operate additional storage). And further, as CDNs may be operated by third parties, the streaming media service provider may not have direct control over the hardware managed by a given CDN.

Embodiments of the invention provide techniques for increasing the probability of a cache hit, without increasing the cost or the actual cache sizes of the content caches of different CDNs. More specifically, embodiments of the invention use the preference rankings for CDNs generated in response to content requests to partition streaming media content across different CDNs. For example, the streaming media provider may determine a fixed subset of media content for which the preference will be set to a given CDN. Such a partition may be referred to as a "soft" partition, as it may be the case that all of the streaming media content remains available from each CDN. That is, the partitioning of content across CDNs may not be absolute such that any content item may be requested from any CDN. Doing so ensures that content remains available even where the preferred CDN for a given content item fails (or simply suffers from a period of degraded performance or performs poorly for a particular user). Similarly, in cases where the preference rankings provide a probability for each CDN, storing the content at each CDN ensures that the client can select a CDN according to the probabilities. In other cases, partitioning may also be carried out such that some content items are not available on some of the CDNs. For example, each content item may be available on exactly two CDNs.

When providing a library of streaming content to subscribers, a small number of then currently popular titles may account for the majority of streaming activity engaged in by subscribers. In one embodiment, a specified number of popular content items are not assigned to a CDN partition. That is, popular titles are not assigned to the "soft" partition of a specific CDN, as diversity across CDNs is valuable for scalability. Doing so allows a given content item to remain available from each cluster of servers operating as a distinct CDN (whether operated by the streaming media service provider or otherwise). At the same time, requests for content items assigned to a particular CDN partition are preferentially served from that partition. Note, whether an item is "popular" may be determined in a number of ways, for example based on an explicit provisioned list of items that are deemed currently popular or based on heuristics measuring how frequently a given content item has been requested over a recent period, relative to others.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Further, particular embodiments of the invention are described using an example of a web browser running on a personal computer being used to stream movies, music, television programming, etc., over a data communications network. However, it should be understood that the invention may be adapted to for streaming video service accessed using a broad variety of network aware/capable consumer electronics devices such as DVD players, Blu-ray® players, web-based interfaces, set-top boxes, mobile telephones, game platforms, portable music players, home media systems, etc. Accordingly, references to a streaming media client executed by a web browser are included to be illustrative and not limiting.

Figure 1:
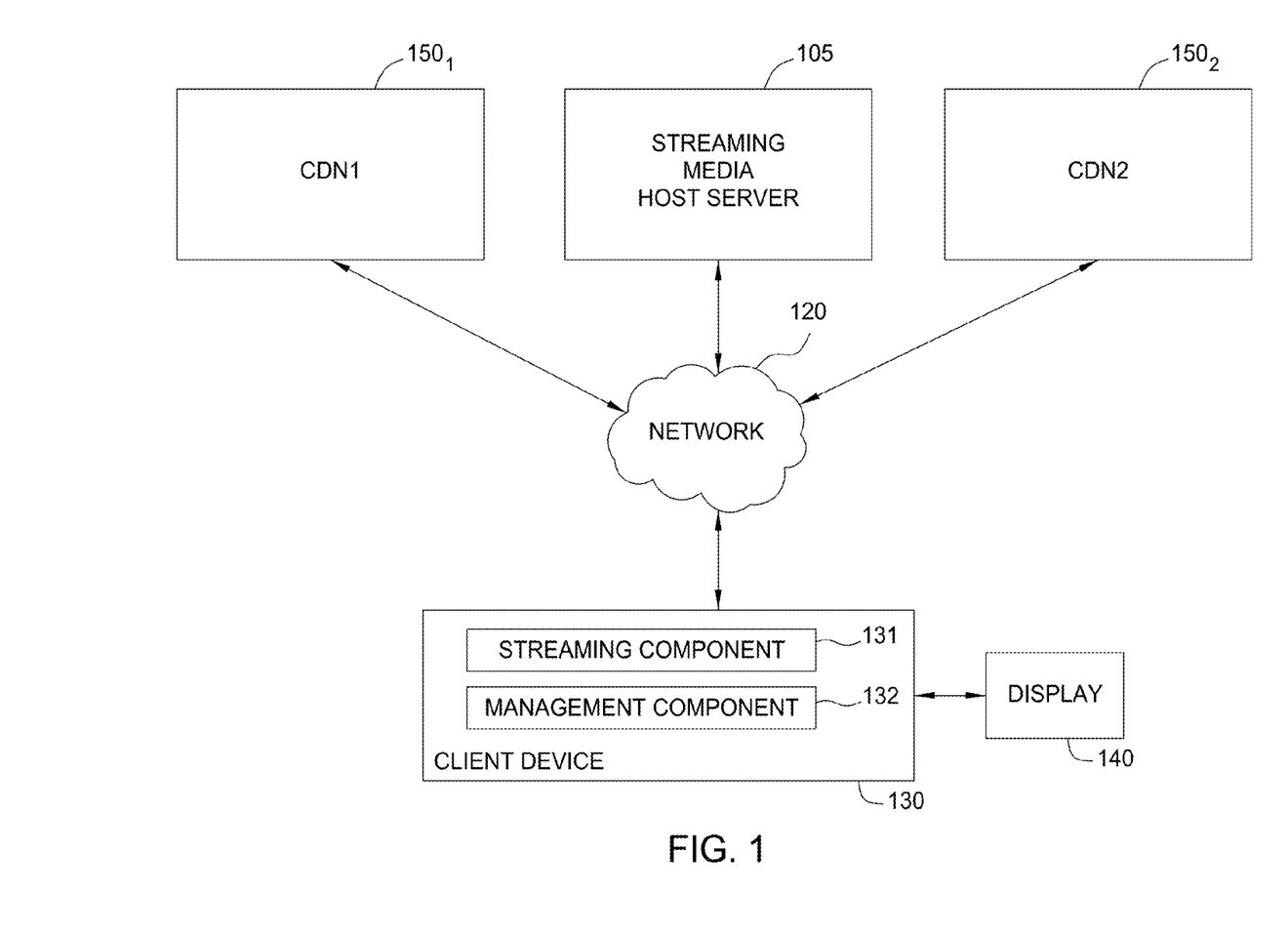
FIG. 1 illustrates a computing infrastructure configured to provide streaming media content to client devices using multiple content distribution networks (CDNs), according to one embodiment of the invention.

FIG. 1 illustrates a computing infrastructure 100 configured to provide streaming media content to client devices 130 using multiple content distribution networks (CDNs), according to one embodiment of the invention. As shown, the computing infrastructure 100 includes a first CDN $150_1$, a second CDN $150_2$, a streaming media host server 105, and a client device 130, each connected to a data communications network 120.

The streaming media host server 105 generally responds to user requests to subscribe to the streaming media service, search for content available using the streaming media service, and provide references (URLs) to access titles in the library of streaming media content stored in CDNs $150_1$, $150_2$, etc. In one embodiment, steaming media host server 105 may include a server computing system running database, and application server (as well as other software programs) configured to respond to requests for web pages and/or streaming media content received from client device 130.

Each CDN 150 may store a set of copies of the streaming media titles available from the streaming media service, where each copy encodes a given title at a different bit rate. In one embodiment, the streaming media host server 105 may also be configured to manage how requests for streaming media content are serviced by the CDNs $150_1$, $150_2$. For example, in addition to passing client device 130 preference information in order to maintain a desired ratio of streaming traffic between CDNs 150 (e.g., a 60/40 spilt), the preference information may be used to create content partitions in CDN $150_1$ and CDN $150_2$. Generally each content partition may correspond to a discrete set of titles available from the streaming media service. Further still, in one embodiment, the streaming media host server 105 may dynamically adjust the preferences for a given title in response to feedback indicating that a CDN is performing poorly when streaming content, e.g., to a given geographical region, to a given ISP, or for other reasons.

In one embodiment, the client system 130 provides a computer system running a web-browser. Accordingly, client system $130_1$ may be a desktop PC, laptop computer, home-theater PC (HTPC), tablet computer, gaming console or other computing system capable of running a web-browser. In such cases, the web-browser is configured to obtain a streaming media interface from the streaming media host server 105 rendered on a display 140, e.g., an LCD monitor, as well as stream and decode media content played back on the display 140.

Client system 130 could also be a set-top device connected to both network 120 and display 140 (e.g., a flat-panel television). Accordingly, client system 130 is also representative of digital cable boxes, digital video recorder (DVR) systems, video game consoles, and other streaming media devices, as well as DVD players capable of connecting to a network 120 and receiving and playing back media streams provided by media server 105. Such devices may have built-in software/firmware for management (132) and streaming (131), or in some cases some or all portions of the software can be downloaded dynamically—for example, some Blu-ray® disc players can download and execute BD-live applications. Further, display 140 may itself be an integrated device capable of connecting to the network 120 and playing back media streams supplied by the media server 105. For example, some flat-panel television displays include integrated components used to connect to a streaming media service, video on demand services, or video sharing websites. As another alternative, client system 130 could be a mobile computing device, such as mobile telephone, tablet or net book, which includes either a dedicated application (or "app") or software dynamically loaded into the device's web browser, Regardless of what type of client device 130 is used to access the streaming media service, the client system 130 communicates with the streaming media host server 105 over the network 120 to access the streaming media service. For example, the management component 132 may allow a subscriber to authenticate themselves (e.g., using a username and password) with the streaming media host server 105, and choose a streaming media title. Then, the streaming component 131 may be used to stream and decode the streaming media title.

In one embodiment, when a user requests access to a streaming media title, the host server 105 may provide the client device 130 with a ranked list of CDNs from which the client device 130 should use to access the requested title. The list may include a set of links (e.g., http URLs) to encodings of the requested title on both CDN $150_1$ and CDN $150_2$. In response, the streaming component 131 selects one of the CDNs 150 in the list to use to stream the requested title. Thus, while the host server 105 may indicate a preference for one CDN 150 over the others, the client device 130 may have the final decision in selecting one of the CDNs 150. Doing so allows the client device 130 to select a non-preferred CDN when the performance of the preferred CDN falls below an acceptable threshold.

Figure 2:
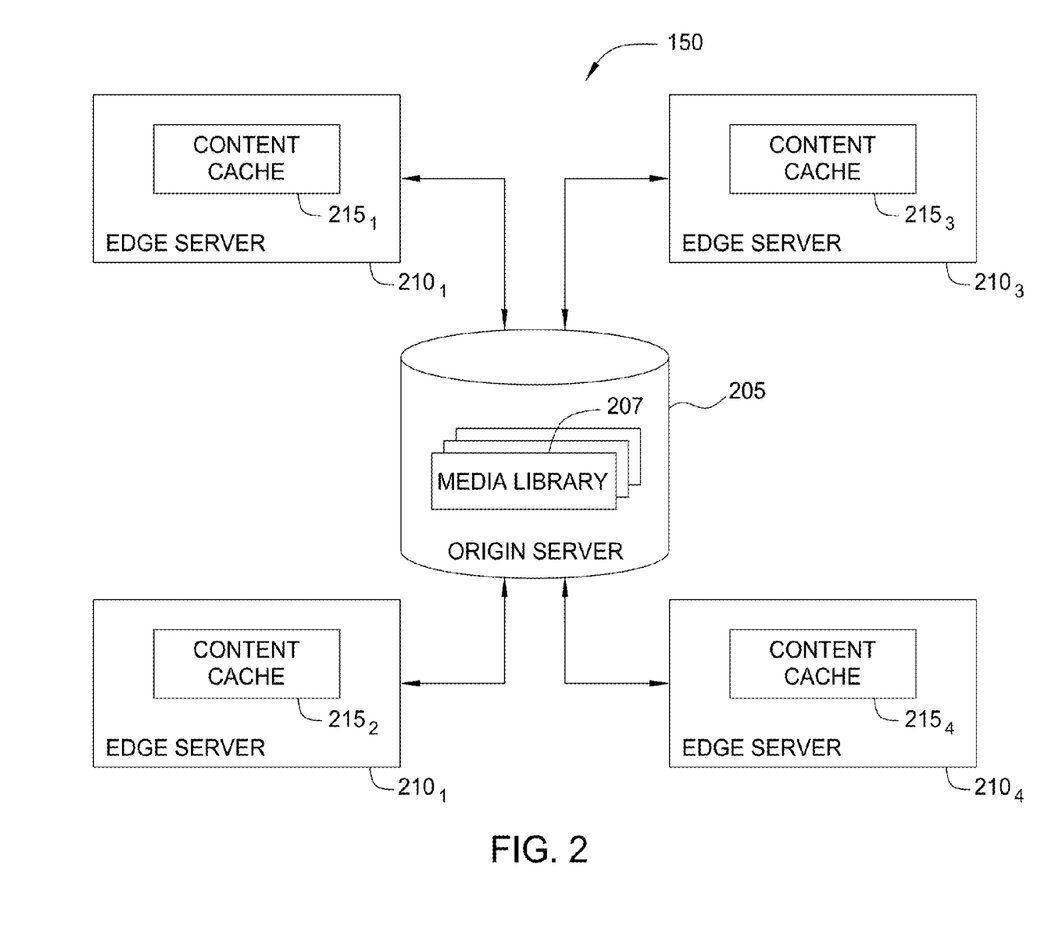
FIG. 2 illustrates an example of a content distribution network configured to host streaming media content, according to one embodiment of the invention.

FIG. 2 illustrates an example of a CDN 150 configured to host streaming media content, according to one embodiment of the invention. As shown, the CDN 150 includes an origin server 205 and four edge servers $210_{1-4}$. The edge servers are deployed so as to be "close" in a network-topology sense to different populations of end-users, for efficient delivery of content. Of course, an actual deployment for CDN 150 may include many more edge servers 210 and could further include additional origin servers 205, and could be constructed in a hierarchical fashion.

In one embodiment, the origin server 205 corresponds to one (or more) computing systems which host a streaming media library 207. The files in the streaming media library 207 generally correspond to the media titles available from a streaming media service. The streaming media library 207 may include multiple copies of each title, encoded at different bit rates. From the origin server 205, titles in the media library 207 are transmitted to any or all of the edge servers $210_{1-4}$. In response to a request from any specific client device 130, the CDN identifies the best edge server—for example $210_2$—which then streams content to a requesting client device 130. Choice of edge server within a specific CDN is generally determined according to CDN proprietary technology developed by a CDN service provider. However, in an additional embodiment, the CDN provider may expose several different alternative edge servers 210 for any particular client device, and the techniques discussed herein may be used to allow the client device to discover and request content from the edge server that is most able to deliver the requested content.

An operator of the CDN 150 may maintain an origin server 205 at one location and edge servers 210 at different geographical locations. For example, the CDN 150 may operate an origin server 205 at one central location and operate edge servers 215 near different population centers. When a user requests a title from media library 207, content is streamed from the origin server 205 to one of the edge servers 210. Once transmitted, that media title may be stored by the edge server 210 in content cache 215. Thereafter, if another request is made for the same media title, it may be streamed form the content cache 215, without needing to again obtain it from the origin server 205. By increasing the number of cache hits that occur, the edge server 210 will reduce the amount of data it needs to pull from the origin server 205, improving both the efficiency of the CDN 150 and the quality of experience for users.

In addition to geography, edge servers 210 may be used to provide more bandwidth to certain groups of subscribers. For example, the number of edge servers 210 operated to stream content to a large subscriber population center may be greater than the number of edge servers 210 present near smaller subscriber population centers.

As new titles are stored in cache $215_{1-4}$, other titles may be evicted. In one embodiment, titles may be evicted from the content cache $215_{1-4}$ on a least recently used basis. The content in each cache $215_{1-4}$ may be determined independently of one another. However, popular titles are likely to be requested by clients that access each edge server $210_{1-4}$, content caches $215_{1-4}$ may generally mirror one another. At the same time, some titles from the media library 207 may be more popular to users near one edge server than another (i.e., some content may be popular in certain regions).

The content of a cache $215_1$ is generally driven by what titles are requested by users. However, as noted above, while the origin server 205 may store the complete media library 207 available from a streaming media service, the streaming media service may indirectly create content caches 215 that are relatively distinct across two different CDNs 150. For example, by partitioning CDN preference by title and sending preference data to requesting client devices based on the defined partitions, over time, the resulting caches in the edge servers 210 of different CDNs 150 may store a largely non-overlapping set of media titles. At the same time, CDN preferences for streaming "popular" content (however measured) may be exempt from the partitioning.

Figure 3:
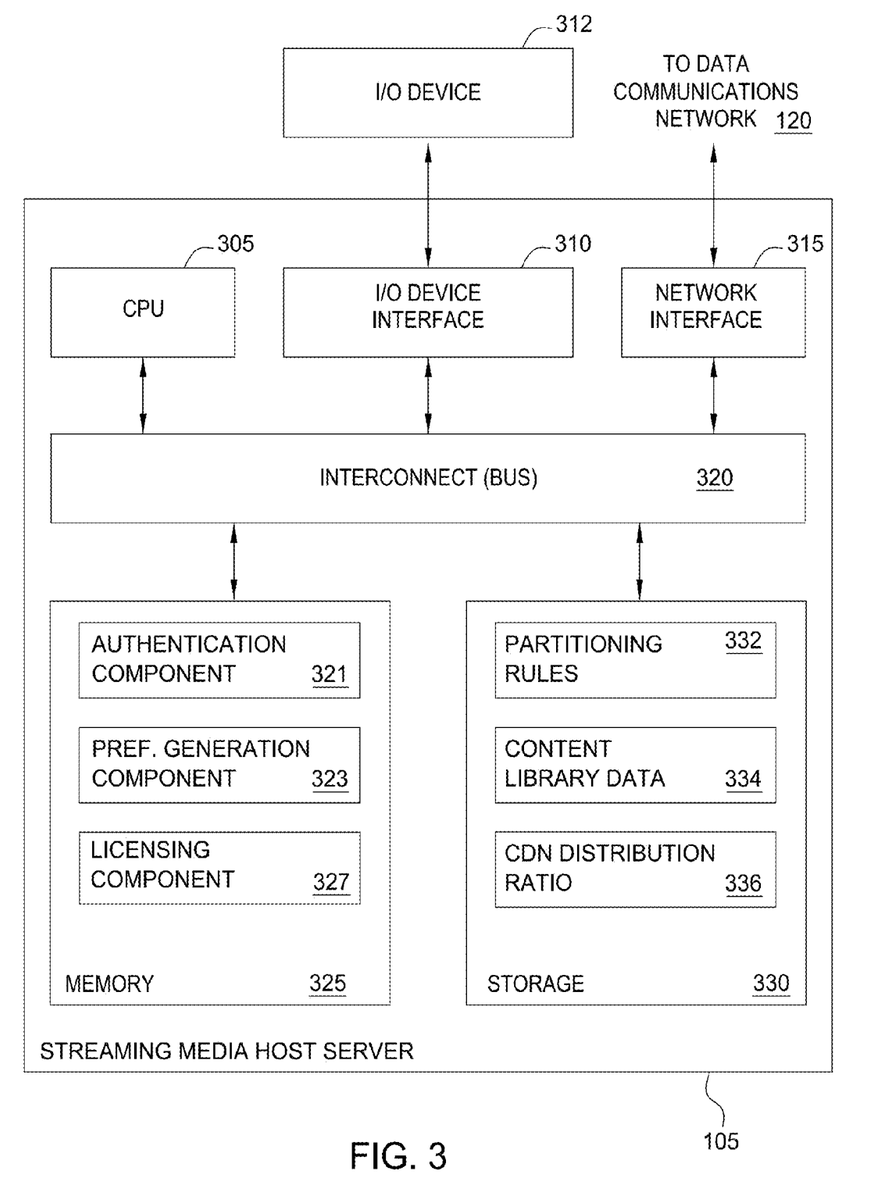
FIG. 3 illustrates an example of the streaming media host server, according to one embodiment of the invention.

FIG. 3 illustrates an example of the streaming media host server 105, according to one embodiment of the invention.

As shown, the host server 105 includes, without limitation, a central processing unit (CPU) 305, a network interface 315, an interconnect 320, a memory 325, and storage 330. The host server 105 may also include an I/O device interface 310 connecting the host server 105 to I/O devices 312. Note, components of host server 105 shown in FIG. 3 are simplified to facilitate a description of partitioning streaming media files on multiple content distribution networks. Of course, one of ordinary skill in the art will recognize that in practice server systems and data centers may include a variety of additional components including, e.g., server virtualization, hierarchical storage including SSD storage systems, monitoring and supervision interfaces, etc.

The CPU 305 retrieves and executes programming instructions stored in the memory 325. Similarly, the CPU 305 stores and retrieves application data residing in the memory 325. The interconnect 320 facilitates transmission, such as of programming instructions and application data, between the CPU 305, I/O devices interface 310, storage 330, network interface 315, and memory 325. CPU 305 is included to be representative of a single CPU, multiple CPUs, a single CPU having multiple processing cores, and the like. And the memory 325 is generally included to be representative of a random access memory. The storage 330 may be a disk drive storage device. Although shown as a single unit, the storage 330 may be a combination of fixed and/or removable storage devices, such as fixed disc drives, removable memory cards, solid state (SSD) storage devices, or optical storage, network attached storage (NAS), or a storage area-network (SAN) accessed over a network.

Illustratively, the memory 325 includes an authentication component 321, a preference generation component 323 and a licensing component 327. And storage 330 includes partitioning rules 332, content library data 334 and CDN distribution ratio 336. In one embodiment, the authentication component 321 is configured to authenticate a user request for access to content provided by the streaming media service. Once a user (and/or individual request) for a media title is authenticated, the licensing component 327 may generate a license token presented to a CDN. The token authorizes the CDN to stream a media title to a given client device.

In addition to any licensing authorizations or tokens given to a client device, the preference generation component 323 may be configured to determine a ranked list of CDNs to send to the client in response to a request for a streaming media title. The ranked list may include links to the requested media title in two (or more) CDNs. In response, the client device may stream the requested title from a selected one or more of the CDNs. Typically, the client device selects the highest ranked CDN, unless that CDN is measured and/or predicted by the client device to perform sub-optimally while streaming content (e.g., due to network congestion or the then current streaming load on the highest ranked CDN).

In one embodiment, the ranked list may be generated according to partition rules 332. For example, each streaming media title could be associated with a distinct numerical identifier (specified in the content library data 334). In such a case, titles having an even-valued identifier could result in a preference ranking favoring a first CDN, while titles having an odd-valued identifier could result in a preference ranking favoring a second CDN. Doing so results in content caches in edge servers of the first and second CDN storing relatively distinct set of media titles.

Of course a variety of other approaches other than a simple 50/50 distribution could be used. For example, in one embodiment, the CDN distribution ratio 336 specifies what percentage of traffic should serviced by the first and second (and third, etc.) CDNs. Thus, in the case of a non-equal split, the partitioning rules could be configured 332 to preferentially rank one CDN over another in the preferences sent to clients (e.g., as in the case of a 60/40 or other split).

Further, in one embodiment, certain titles may be exempt from the partitioning process. That is, not all the titles in a media library need to be included in a "soft" partition as defined by the partition rules 332. For example, the preference generation component 323 may select a CDN to specify as a preferred CDN in a preferences list sent to a client for "popular" titles by a random or weighted random process. Doing so ensures that "popular" titles are served by each available CDN equally or according to the CDN distribution ratio 336.

Further still, the preference generation component 323 may be configured to adjust the ranking of a given CDN by gathering real-time information on CDN performance from streaming clients and using this information to adjust the preference instructions provided to client devices. For example, instances of clients selecting a "non-preferred" CDN, or failing over during streaming may be counted and aggregated on a geographical, ISP or other basis. Evidence of falling CDN performance may then be used to adjust CDN preferences provided to clients in those same geographic areas or ISPs. Doing so may improve performance for streaming clients as it results in the preferred CDN being more likely to perform well on the first try. Further, directing traffic away from a poorly performing CDN may alleviate those very performance problems (i.e., directing traffic away from an oversubscribed CDN may improve performance of that CDN). Similarly, the "rankings" may provide a probability or weight used favoring one CDN over another. In such a case the client chooses a CDN according to those probabilities.

Figure 4:
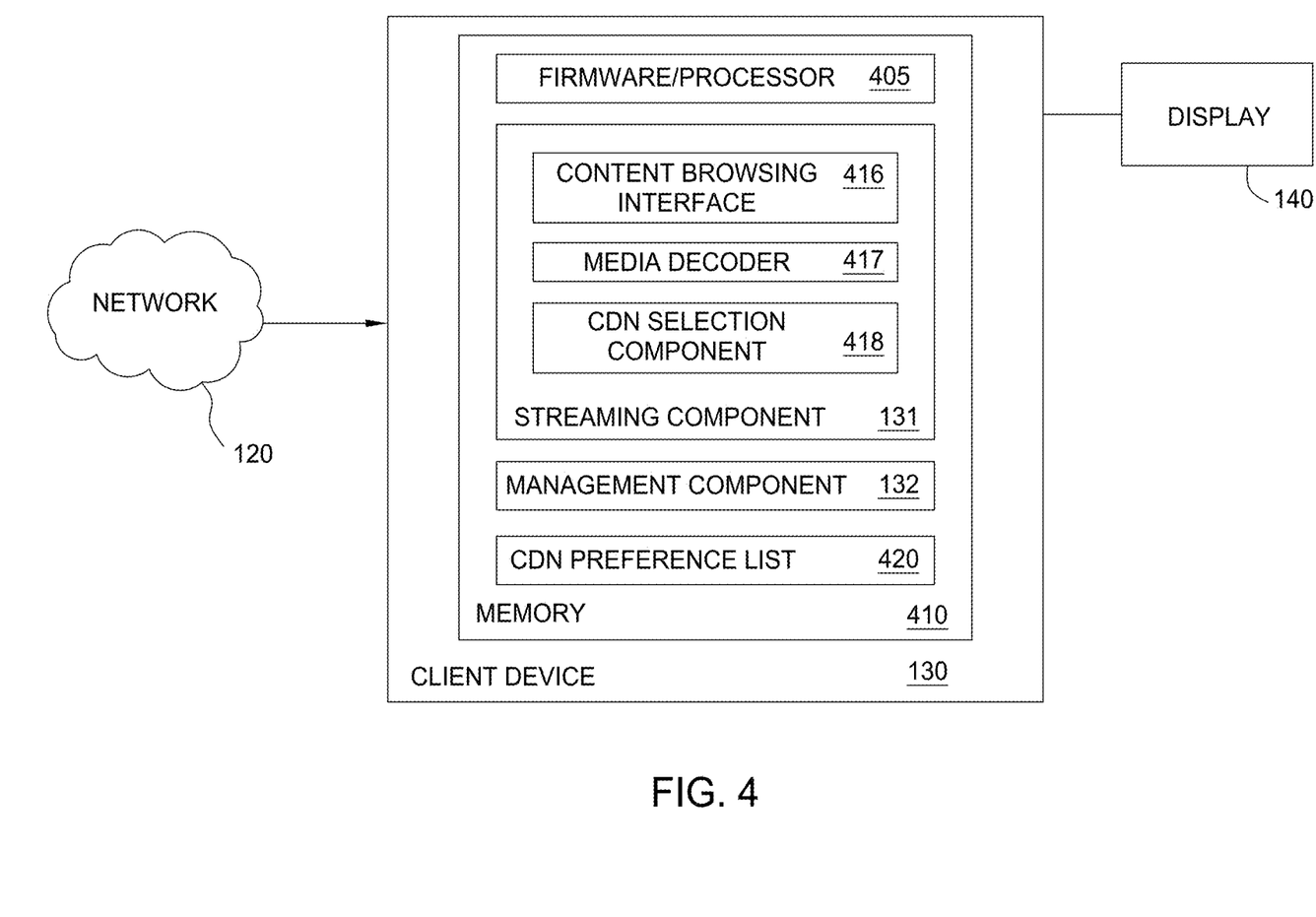
FIG. 4 illustrates an example of a client device used to view streaming media content, according to one embodiment of the invention.

FIG. 4 illustrates an example of a client device 130 used to view streaming media content, according to one embodiment of the invention. In this example, a streaming media client device is connected to both a display screen (e.g., a flat panel television) and a network. Accordingly, as shown, the client device 130 is connected to both a network 120 and to a display 140. Note, client device 130 is included to be representative of a cable-set top box, a digital video recorder (DVR), or television with integrated streaming functionality, as well as dedicated streaming devices (e.g., a Roku® device) connected to a television display. However configured, the client device 130 may be capable of streaming media content from a variety of different service providers.

As shown, the client device 130 includes firmware/processor 405, memory 410 and storage 435. The firmware 405 represents operating logic used to control the client device 130. For example, the firmware 405 may be configured to allow users to schedule recordings, connect to streaming media services, select content for playback, etc.

Illustratively, the memory 410 includes the streaming media component 131 and a management component 132 as well as a CDN preference list 420. In this example, the streaming media component 131 provides software on the client device 130 used to access a given streaming media service. As shown, the streaming media component 131 includes a content browsing interface 416, a media decoder 417 and a CDN selection component 418. The content browsing interface 416 allows a user to interact with a streaming media service, e.g., to search for titles and select titles for playback. In turn, the media decoder 417 is generally configured to decode and data streamed over the network 120 and display video and audio to the user. Once a user selects a title, the streaming media client 410 may be configured to request that title from the streaming media host server. For example, the streaming media client 410 may complete a licensing and/or authentication exchange with the streaming media host server as well as receive the CDN preference list 420 from the host server. As noted, the CDN preference list 420 may provide a list of links to multiple encodings of the requested title, ranked by CDN preference. The CDN preference list 420 may also include weights used by the streaming media component 131 to evaluate the relative performance of different CDNs.

Once the CDN preference list has been received, the CDN selection component 418 may evaluate the networking performance of each CDN and select one (or more) from which to stream the requested media title. For example, the CDN selection component 418 may be configured to choose the first CDN on the preference list, so long as the performance measurements for that CDN exceed a minimum threshold. If not, and if the second (or third, etc.) CDN has better performance, then the CDN selection component 418 selects the better performing CDN. In one embodiment, however, the measured performance of the second CDN may need to exceed another threshold before the second CDN is selected. That is, if the first CDN does not exceed the minimum threshold, the relative performance of the second CDN may need to be improvement of a sufficient magnitude before the client selects the non-preferred CDN. This avoids the non-preferred CDN from being selected in cases where it offers only marginally improved performance. Doing so may help the service provider maintain a preferred distribution among the CDNs (e.g., a 60/40 split). In normal operation the CDN performance frequently does not differ greatly between CDNs and thus the CDN selection component 418 typically selects the CDN with the highest preference ranking. However, when congestion or overload is present anywhere between the CDN edge server and the client device, CDN performance may differ substantially, and high customer value is achieved by routing to a non-primary CDN.

In addition to selecting an initial CDN, the streaming media component 131 may monitor the actual streaming performance experienced by client 415 from the chosen CDN while the selected media title is presented to the viewer. If the performance of the chosen CDN degrades, the streaming media client may choose to retry other CDNs, and/or begin streaming the selected title from a different CDN.

In an alternative embodiment, the streaming media component 131 may be configured to request data from more than one CDN, for example requesting data in rotation in substantially non-overlapping chunks from each of several different CDNs (the active CDNs) selected from the full list. This provides a means for the media client to continuously monitor the performance of each active CDN. In this embodiment, selection of a CDN is not an all-or-nothing selection. Instead, the client could choose to request, e.g., 90% of the chunks from the primary CDN, and 5% each from the two next best performing CDNs. In the case where the primary CDN is performing sufficiently worse than a secondary, the weighting can be shifted. Further, the client could choose to drop the original primary CDN from the active list, and introduce a new substitute from the full list in order to begin establishing a new performance baseline for possible future use. A suitable timeout is used so that if a chunk is not delivered from the CDN from which it is requested in a timely fashion, that chunk is requested again from a different CDN to avoid interruption in the presentation to the user.

Figure 5:
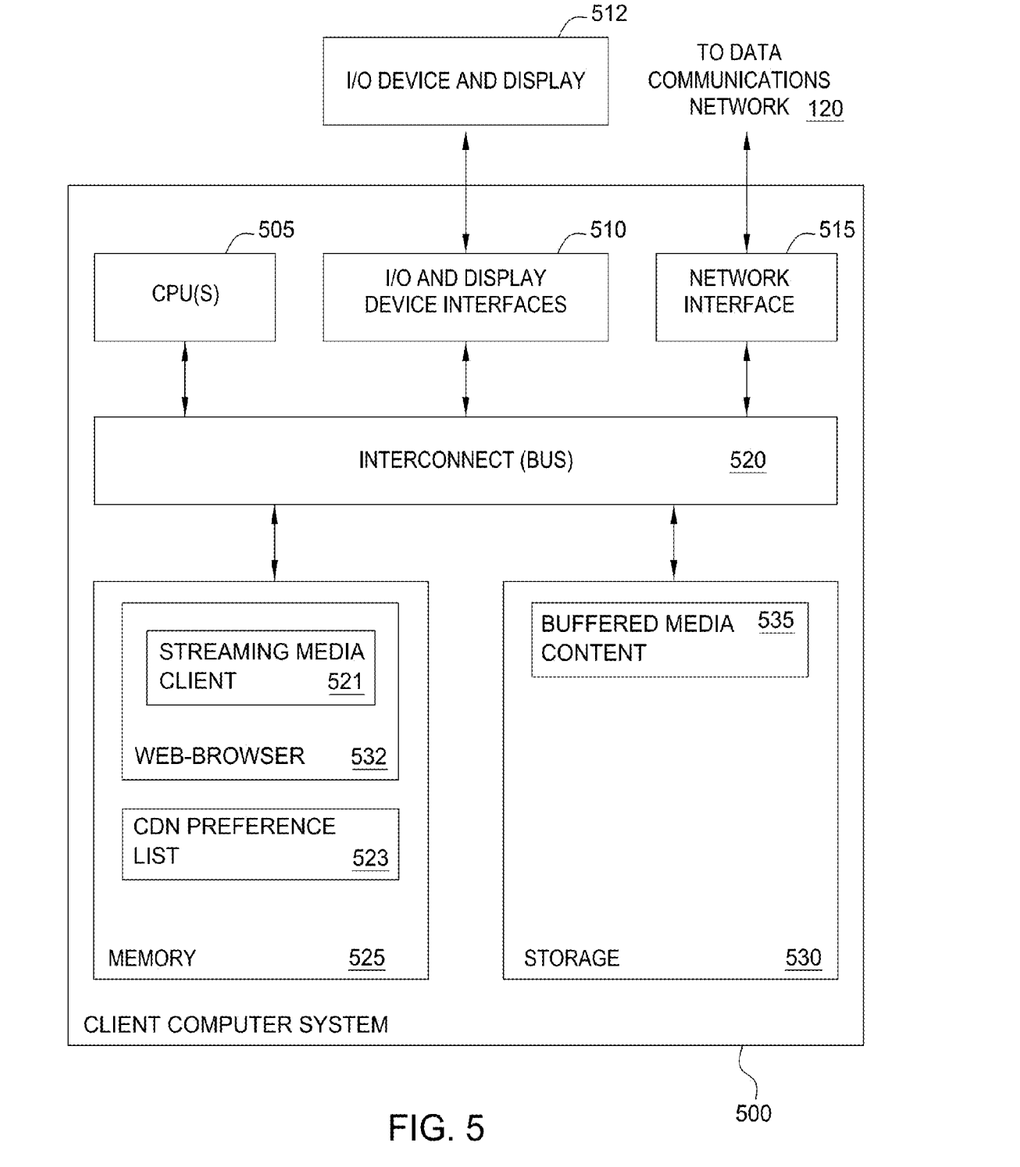
FIG. 5 illustrates an example of a computing system used to view streaming media content, according to one embodiment of the invention.

FIG. 5 illustrates an example of a client device 130 used to view streaming media content, according to one embodiment of the invention. As shown, a client computing system 500 includes, without limitation, a central processing unit (CPU) 505, a network interface 515, a bus 520, a memory 525, and storage 530. The computing system 500 also includes an I/O device and display interface 510 connecting I/O devices and a display 512 to the computing system 500 (e.g., a keyboard, mouse or remote control, along with a monitor (e.g., an LCD panel).

Like CPU 205 of FIG. 2, CPU 505 is included to be representative of a single CPU, multiple CPUs, a single CPU having multiple processing cores, etc., and the memory 525 is included to be representative of a random access memory. The bus 520 connects CPU 505, I/O devices interface 510, storage 530, network interface 515 and memory 525. The network interface 515 is configured to transmit data via the communications network 120, e.g., to communicate with the host server 105 and stream media content from form CDNs 150. Storage 530, such as a hard disk drive or solid-state (SSD) storage drive, may store audio video data files along with other content.

Illustratively, the memory 525 includes a web browser 532, which itself includes a streaming media client 521, and the storage 530 stores buffered media content 535. The browser 532 provides a software application which allows a user to access web pages and other content hosted by a server. In context of the present disclosure, the streaming media client 521 generally corresponds to software components retrieved from a streaming media service in order to playback media content from that streaming media service. Content downloaded from the streaming media service may be stored in storage 530 as buffered media content 535 prior to being decoded and played back by streaming media client 521.

The streaming media client 521 may also be configured to provide the functionality as described above relative to the streaming media client of the client device 130 shown in FIG. 3. Accordingly, the streaming media client 521 may be configured to select a CDN form a preference list 523 to use in streaming a requested streaming media title. Or alternatively, the preferences list may provide a "weight" or probability and the client chooses a CDN according to those probabilities.

Figure 6:
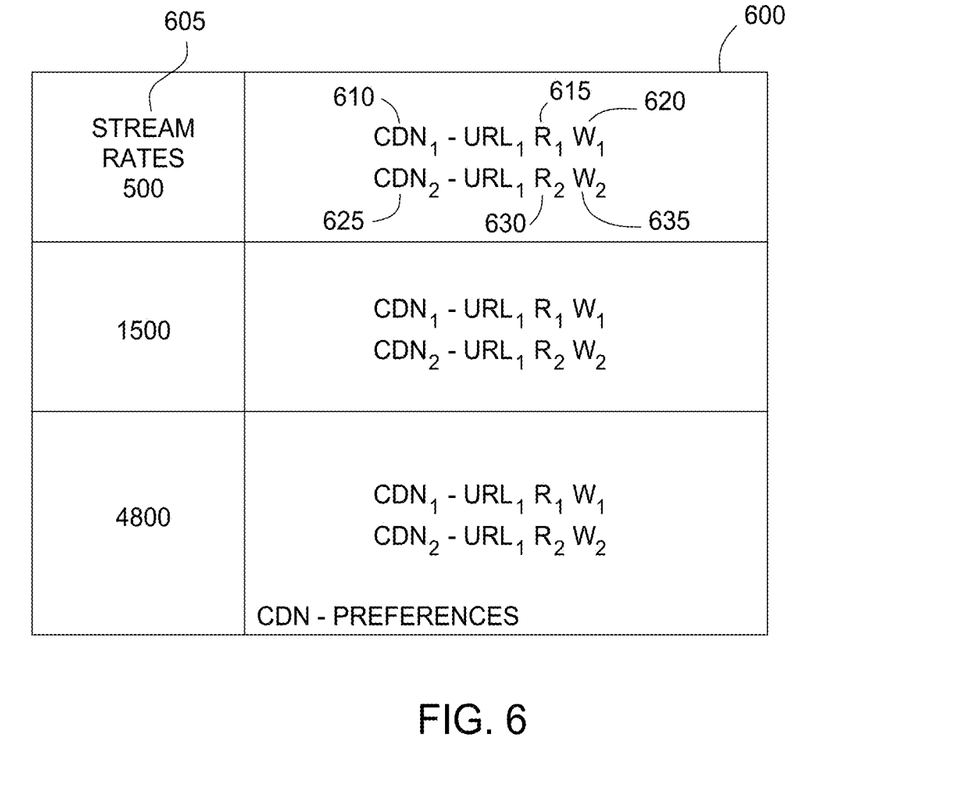
FIG. 6 illustrates an example of a preferences list ranking multiple CDNs available to stream media content, based in part, on the requested media content, according to one embodiment of the invention.

FIG. 6 illustrates an example of a preferences list 600 ranking multiple CDNs available to stream media content, the requested media content, according to one embodiment of the invention. As shown, the list 600 includes links to three encodings of a streaming media title available at a first and second CDN (labeled as $CDN_1$ and $CDN_2$) for three streaming bit rates 605. For example, for the slowest available encoding of 500 kbps induces a first link 610 "$CDN_1$-URL," an associated ranking 615 "$R_1$," and a weight 620 "W." The preferences list 600 also includes a second link 625 "$CDN_2$-URL" for the 500 kbps encoding along with an associated ranking 630 "$R_2$" and a weight 635 "W." The preferences list 600 also includes URL links for $CDN_1$ and $CDN_2$ for both a 1500 kbps bit rate and 4800 kbps bit rate encoding of a requested streaming media title.

In one embodiment, a streaming media client may select a CDN to stream a media file from by evaluating preferences list 600. For example, the streaming media client may sample the bandwidth available to determine the maximum bit rate the client can be expected to support without resulting in buffer under runs. Once the client determines the bit rate at which to stream media content, the client may then select a CDN from which to stream that content (at the selected bit rate). For example, the client may sample the network performance of the first and second CDN, and if the latency (or other metric of network performance) of the preferred CDN is within a specified threshold, indicating that the network performance of the preferred CDN should provide the client with a good quality of experience, then the preferred CDN is selected.

Otherwise, if the metric of network performance of the preferred CDN is exceeds the specified threshold, indicating that the network performance of the preferred CDN will not provide the client with a good quality of experience, may determine whether to stream the media content from the CDN ranked second (or third, etc.). In one embodiment, the weights assigned to a secondary CDN in the preference list (e.g., weight "$W_2$" 635) may specify how much of an improvement in performance is needed before the non-preferred CDN is selected. For example, the secondary CDN might be required to provide at least a 20% improvement (e.g., in expected latency) before being selected over the highest ranked CDN. By setting a minimum amount of expected improvement in performance, the client device does not switch to the non-preferred CDN for small or marginal improvements in performance. Doing so helps enforce the "soft" partitions, as the selected title is not pulled into the content cache of an edge server of the secondary CDN. Further, doing so helps maintain an overall distribution of traffic to different CDNs. Conversely, when the performance difference is sufficiently high, the secondary CDN can be used to ensure a high quality of experience for subscribers of the streaming media service.

Figure 7:
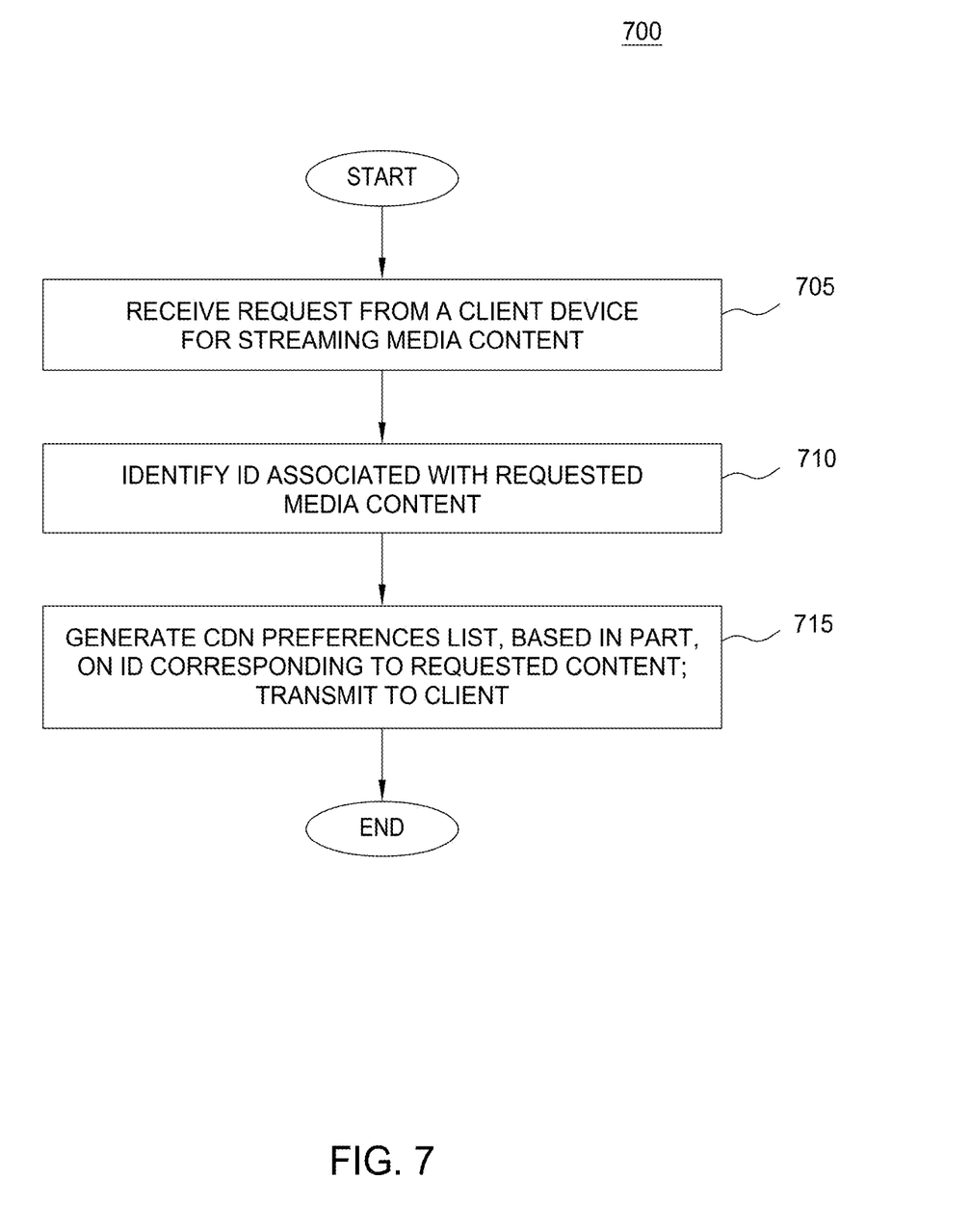
FIG. 7 illustrates a method for a streaming media service provider to respond to a client request to stream media content, according to one embodiment of the invention

FIG. 7 illustrates a method 700 for a streaming media service provider to respond to a client request to stream media content, according to one embodiment of the invention. As shown, method 700 begins at step 705 where a streaming media host receives a request for a streaming media title. As discussed above, such a request may be generated by a client interacting with a streaming media interface on a web browser or interface generated by a dedicated client device. Once received, the streaming media host may determine an identifier associated with the requested media content. For example, each title may be associated with a distinct numerical value. Once determined, the streaming media host may generate a CDN preferences list, based in part, on the ID corresponding to the requested content. The CDN preferences list is then transmitted to the client, which selects a CDN to stream the requested media content from, based in part, on the ranked preferences indicated in the CDN preferences list. As noted, in addition to the title ID, the streaming media host may specify the CDN preferences to maintain a certain ratio of traffic between the first and second (and third, etc.) CDN.

Figure 8:
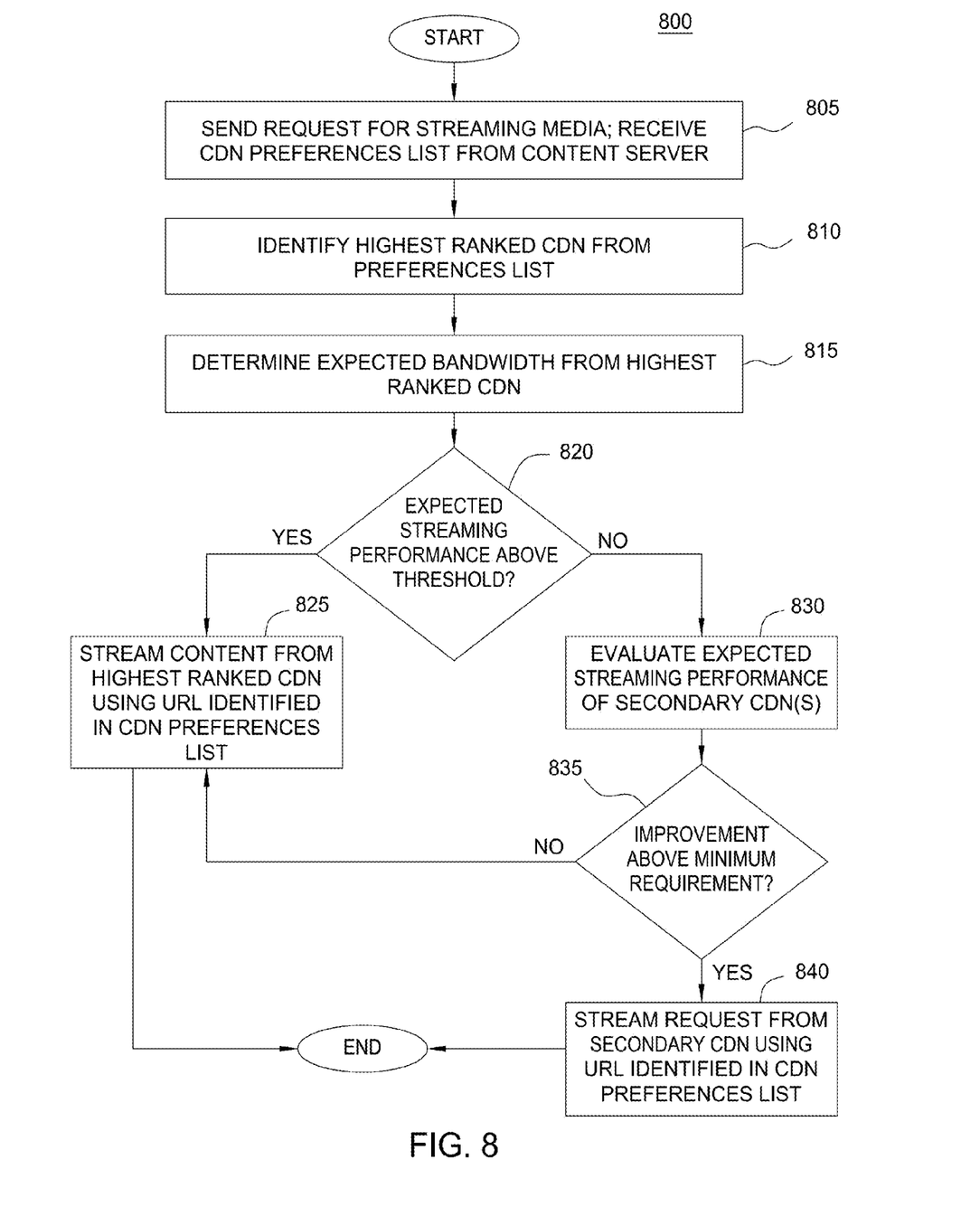
FIG. 8 illustrates a method for a client to select one of multiple CDNs to obtain streaming media content from, according to one embodiment of the invention.

FIG. 8 illustrates a method 800 for a streaming media client device to select one of multiple CDNs to obtain streaming media content from, according to one embodiment of the invention. As shown, the method 800 begins at step 805, where the client device sends a request for streaming media content to a streaming media host server. Following any needed client authentication, the client receives a list of links to the requested content at two (or more) CDNs, where the CDNs are ranked by preference. At step 810, the client identifies the highest ranked CDN from the preferences list. At step 815, the client determines an expected streaming performance of the highest ranked CDN in the preferences list (e.g., based on available bandwidth and network latency or other factors). If the expected streaming performance exceeds a minimum quality threshold, then at step 825, the client streams content from the highest ranked CDN, e.g., using a URL for the requested media title specified in the CDN preferences list.

Otherwise, if the expected streaming performance of the highest ranked CDN does not exceed the minimum requirements, then at step 830, the streaming media client device evaluates the expected networking performance of the secondary CDN (or CDNs). At step 835, if the expected streaming performance of a secondary CDN will provide a minimum improvement, as determined relative to weights specified in the CDN preferences list, then at step 840 the client device streams the requested content from a secondary CDN, again, e.g., using a URL for the requested media title specified in the CDN preferences list. Otherwise, if switching to a secondary CDN does not provide an improvement to the expected streaming performance (or the improvement is only marginal), then the client streams content from the highest ranked CDN.

Figure 9:
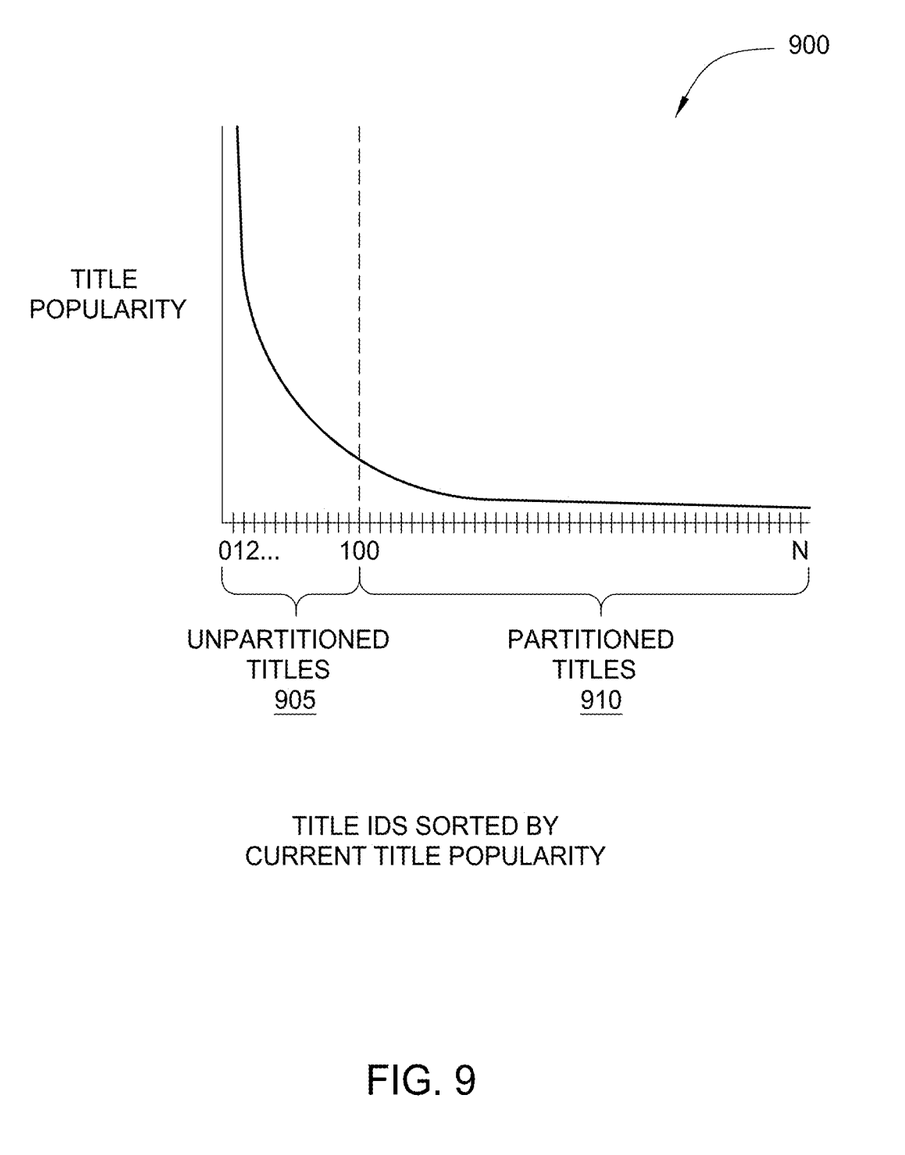
FIG. 9 illustrates a graph of streaming media titles, which includes a group of titles assigned to CDN partitions and a group of titles not assigned to CDN partitions, according to one embodiment of the invention.

In one embodiment, the streaming media host server may be configured to create "soft" partitions of certain titles across different CDNs. For example, FIG. 9 illustrates a graph 900 of streaming media titles, which includes a group of titles assigned to CDN partitions and a group of titles not assigned to CDN partitions, according to one embodiment of the invention. As shown, the graph 900 plots the popularity of titles available from the streaming media service, sorted from highest to lowest. As can be seen from the graph 900, the popularity of the available titles falls rapidly from the most popular title until stabilizing and remaining relatively constant for the majority of titles available from the streaming media service. More generally, the number of "popular" titles available from the streaming media service may be a small percentage of the overall total number of titles. In one embodiment, the streaming media service provider may generate CDN preference lists that do not partition the popular titles, represented in FIG. 9 as un-partitioned titles 905. Doing so allows a small number of frequently requested streaming media titles to be serviced by multiple CDNs. While at the same time, the remaining titles (represented in FIG. 9 as partitioned titles 910) are partitioned across the multiple CDNs. As described above, doing so indirectly creates content caches at different edge servers are relatively distinct across two different CDN s 150.

In an alternative embodiment, three (or more) CDNs are referenced in a preference list. In such a case, the most popular content could still be replicated at each CDN, allowing for maximum flexibility and load distribution. The next most popular tranche of content is replicated at all but one CDN, with each specific title being hosted by an independently selected N out of M hosts. Additional tranches or tiers of decreasingly popular content are hosted with less replication, but even the least popular content is hosted on at least one CDN. As a specific example, titles ranked 1-10 are hosted at four CDNs called A, B, C and D. Titles 11-25 are hosted at three out of 4 CDNs, where title 11 is hosted at A, B, and C, title 12 at A, B and D, title 13 at A, C, and D etc. Titles 26-50 are hosted at two CDNs, and titles 51-100 are hosted at just one CDN.

In sum, techniques are disclosed for generating preference rankings in response to requests for streaming media content received from client devices. The preference rankings are used to indirectly partition streaming media content across different content distribution networks (CDNs). Such partitions may be referred to as a "soft" partition, as all of the streaming media content remains available from each CDN.

That is, the partitioning of content across CDNs is not absolute, and any content item may be requested from any CDN. Doing so ensures that content remains available even where the preferred CDN for a given content item fails (or simply suffers from a period of degraded performance), while at the same time increasing the probability of a cache hit at the CDNs, without increasing the cost or the actual cache sizes of the content caches of different CDNs.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

We claim:

1. A computer-implemented method for providing a client device with a streaming media title, the method comprising:
receiving a request for a first streaming media title from a first client device, wherein the first streaming media title is included in a first soft partition of media titles associated with a library of streaming media titles, and preference for a first subset of content distribution networks (CDNs) included in a plurality of CDNs is assigned to the first soft partition of media titles;
generating, based on inclusion of the first streaming media title in the first soft partition of media titles, a first preferences list that includes one or more links to the first streaming media title and that ranks the links to the first streaming media title in the first preferences list by order of preference for streaming the first streaming media title to the first client device, wherein a highest preference link included in the first preferences list is associated with a first CDN included in the first subset of CDNs;
receiving a request for a second streaming media title from a second client device, wherein the second streaming media title is included in a second soft partition of media titles associated with the library of streaming media titles, preference for a second subset of CDNs included in the plurality of CDNs is assigned to the second soft partition of media titles, and the first subset of CDNs is different than the second subset of CDNs; and
generating, based on inclusion of the second streaming media title in the second soft partition of media titles, a second preferences list that includes one or more links to the second streaming media title and that ranks the links in the second preferences list by order of preference for streaming the second streaming media title to the second client device, wherein a highest preference link included in the second preferences list is associated with a second CDN included in the second subset of CDNs.

2. The method of claim 1, wherein the first client device:
evaluates an expected streaming performance associated with the first CDN, and
upon determining that the expected streaming performance exceeds a specified threshold, retrieves the first streaming media title from the first CDN via one of the links included in the first preferences list.

3. The method of claim 1, wherein the first client device:
evaluates an expected streaming performance associated with the first CDN, and
upon determining that the expected streaming performance does not exceed a specified threshold, evaluates an expected streaming performance associated with a third CDN that is not included in the first subset of CDNs assigned to the first soft partition.

4. The method of claim 3, wherein the first client device:
upon determining that the expected streaming performance associated with the third CDN does not exceed a second specified threshold, retrieves the first streaming media title from the first CDN via one of the links included in the first preferences list.

5. The method of claim 3, wherein the first client device:
upon determining that the expected streaming performance associated with the third CDN exceeds a second specified threshold, retrieves the first streaming media title from the third CDN via one of the one or more links in the first preferences list.

6. The method of claim 1, further comprising, upon determining that a third streaming media title is assigned to a third partition of media titles, ranking either the first CDN or the second CDN as having the highest preference for streaming the third streaming media title based on a CDN distribution ratio that indicates a ratio of network traffic that will be serviced by at least the first CDN and the second CDN.

7. The method of claim 6, wherein the third partition includes a set of most frequently requested streaming media titles included in the library of streaming media titles.

8. The method of claim 1, wherein each of the one or more links is associated with a probability value and the first client device selects one of the links from which to stream at least a portion of the first streaming media title according to the probability values.

9. The method of claim 1, further comprising:
receiving a request for a third streaming media title from a third client device, wherein the third streaming media title is included in a third partition of media titles associated with the library of streaming media titles, a third subset of content distribution networks (CDNs) included in the plurality of CDNs is assigned to the third partition of media titles, and each streaming media title included in the third partition of media titles is available for streaming only from the third subset of CDNs; and
generating, based on inclusion of the third streaming media title in the third partition of media titles, a list that includes one or more links to the third streaming media title, each link being associated with a CDN included in the third subset of CDNs.

10. The method of claim 9, further comprising:
receiving a request for a fourth streaming media title from a fourth client device, wherein the fourth streaming media title is not assigned to a partition of media titles associated with the library of streaming media titles; and generating a list that includes a plurality of links to the fourth streaming media title, each link being associated with a CDN included in the plurality of CDNs.

11. A non-transitory computer-readable storage medium storing instructions that, when executed by a processing unit, cause the processing unit to performing an operation for providing a client device with a streaming media title, the operation comprising:

receiving a request for a first streaming media title from a first client device, wherein the first streaming media title is included in a first soft partition of media titles associated with a library of streaming media titles, and preference for a first subset of content distribution networks (CDNs) included in a plurality of CDNs is assigned to the first soft partition of media titles;

generating, based on inclusion of the first streaming media title in the first soft partition of media titles, a first preferences list that includes one or more links to the first streaming media title and that ranks the links to the first streaming media title in the first preferences list by order of preference for streaming the first streaming media title to the first client device, wherein a highest preference link included in the first preferences list is associated with a first CDN included in the first subset of CDNs;

receiving a request for a second streaming media title from a second client device, wherein the second streaming media title is included in a second soft partition of media titles associated with the library of streaming media titles, preference for a second subset of CDNs included in the plurality of CDNs is assigned to the second soft partition of media titles, and the first subset of CDNs is different than the second subset of CDNs; and generating, based on inclusion of the second streaming media title in the second soft partition of media titles, a second preferences list that includes one or more links to the second streaming media title and that ranks the links in the second preferences list by order of preference for streaming the second streaming media title to the second client device, wherein a highest preference link included in the second preferences list is associated with a second CDN included in the second subset of CDNs.

12. The non-transitory computer-readable storage medium of claim 11, wherein the first client device:

evaluates an expected networking performance for the first CDN; and upon determining that the expected streaming performance exceeds a specified threshold, retrieves the first streaming media title from the first CDN via one of the links included in the first preferences list, or upon determining that the expected streaming performance does not exceed the specified threshold, evaluates an expected streaming performance associated with a third CDN that is not included in the first subset of CDNs assigned to the first soft partition.

13. The non-transitory computer-readable storage medium of claim 12, wherein the first client device:

upon determining that the expected streaming performance associated with the third CDN does not exceed a second specified threshold, retrieves the first streaming media title from the first CDN via one of the links included in the first preferences list, or upon determining that the expected streaming performance associated with the third CDN exceeds the second specified threshold, retrieves the first streaming media title from the third CDN via one of the links in the first preferences list.

14. The non-transitory computer-readable storage medium of claim 11, wherein the operation further comprises, upon determining that a third streaming media title is assigned to a third partition of media titles, ranking either the first CDN or the second CDN as having the highest preference for streaming the third streaming media title based on a CDN distribution ratio that indicates a ratio of network traffic that will be serviced by at least the first CDN and the second CDN.

15. The non-transitory computer-readable storage medium of claim 14, wherein the third partition includes a set of most frequently requested streaming media titles included in the library of streaming media titles.

16. The non-transitory computer-readable storage medium of claim 11, wherein each of the one or more links is associated with a probability value and the first client device selects one of the links from which to stream at least a portion of the first streaming media title according to the probability values.

17. A system, comprising:

a processor, a memory that includes instructions that, when executed by the processor, configure the processor to perform an operation for providing a client device with a streaming media title, the operation comprising:

receiving a request for a first streaming media title from a first client device, wherein the first streaming media title is included in a first soft partition of media titles associated with a library of streaming media titles, and preference for a first subset of content distribution networks (CDNs) included in a plurality of CDNs is assigned to the first soft partition of media titles;

generating, based on inclusion of the first streaming media title in the first soft partition of media titles, a first preferences list that includes one or more links to the first streaming media title and that ranks the links to the first streaming media title in the first preferences list by order of preference for streaming the first streaming media title to the first client device, wherein a highest preference link included in the first preferences list is associated with a first CDN included in the first subset of CDNs;

receiving a request for a second streaming media title from a second client device, wherein the second streaming media title is included in a second soft partition of media titles associated with the library of streaming media titles, preference for a second subset of CDNs included in the plurality of CDNs is assigned to the second soft partition of media titles, and the first subset of CDNs is different than the second subset of CDNs; and generating, based on inclusion of the second streaming media title in the second soft partition of media titles, a second preferences list that includes one or more links to the second streaming media title and that ranks the links in the second preferences list by order of preference for streaming the second streaming media title to the second client device, wherein a highest preference link included in the second preferences list is associated with a second CDN included in the second subset of CDNs.

18. The system of claim 17, wherein the first client device:
  evaluates an expected networking performance for the first CDN; and
  upon determining that the expected streaming performance exceeds a specified threshold, retrieves the first streaming media title from the first CDN via one of the links included in the first preferences list, or upon determining that the expected streaming performance does not exceed the specified threshold, evaluates an expected streaming performance associated with a third CDN that is not included in the first subset of CDNs assigned to the first soft partition.

19. The system of claim 18, wherein the first client device further:
  upon determining that the expected streaming performance associated with the third CDN does not exceed a second specified threshold, retrieves the first streaming media title from the first CDN via one of the links included in the first preferences list, or
  upon determining that the expected streaming performance associated with the third CDN exceeds the second specified threshold, retrieves the first streaming media title from the third CDN via one of the links in the first preferences list.

20. The system of claim 17, wherein the operation further comprises, upon determining that a third streaming media title is assigned to a third partition of media titles, ranking either the first CDN or the second CDN as having the highest preference for streaming the third streaming media title based on a CDN distribution ratio that indicates a ratio of network traffic that will be serviced by at least the first CDN and the second CDN.

21. The system of claim 20, wherein the third partition includes a set of most frequently requested streaming media titles included in the library of streaming media titles.

22. A computer-implemented method for a client device to stream a media title associated with a library of streaming media titles, the method comprising:
  sending a request for a first streaming media title to a streaming media host server, wherein the first streaming media title is included in a first soft partition of media titles associated with a library of streaming media titles, and preference for a first subset of content distribution networks (CDNs) included in a plurality of CDNs is assigned to the first soft partition of media titles;
  receiving, from the streaming media host server, a first CDN preferences list that includes one or more links to the first streaming media title and that ranks the links to the first streaming media title in the first CDN preferences list by order of preference for streaming the first streaming media title to the client device, wherein a highest preference link included in the first CDN preferences list is associated with a first CDN included in the first subset of CDNs;
  sending a request for a second streaming media title to the streaming media host server, wherein the second streaming media title is included in a second soft partition of media titles associated with the library of streaming media titles, preference for a second subset of CDNs included in the plurality of CDNs is assigned to the second soft partition of media titles, and the first subset of CDNs is different than the second subset of CDNs; and
  receiving, from the streaming media host server, a second CDN preferences list that includes one or more links to the second streaming media title and that ranks the links to the second streaming media title in the second CDN preferences list by order of preference for streaming the second streaming media title to the client device, wherein a highest preference link included in the second CDN preferences list is associated with a second CDN included in the second subset of CDNs.

23. The method of claim 22, further comprising:
  evaluating an expected streaming performance associated with the first CDN; and
  upon determining that the expected streaming performance of the first CDN exceeds a specified threshold, retrieving the first streaming media title from the first CDN via one of the links included in the first CDN preferences list, or upon determining that the expected streaming performance of the first CDN does not exceed the specified threshold, evaluating an expected streaming performance for a third CDN that is not included in the first subset of CDNs assigned to the first soft partition.

24. The method of claim 23, further comprising:
  upon determining that the expected streaming performance of the third CDN does not exceed a second specified threshold, streaming the first streaming media title from the first CDN via one of the links included in the first CDN preferences list, or
  upon determining that the expected streaming performance of the third CDN exceeds the second specified threshold, streaming the first streaming media title from the third CDN via one of the links included in the first CDN preferences list.

25. The method of claim 22, wherein the ranking of each CDN in the first CDN preferences list provides a probability value, and wherein the client device selects a CDN according to the probability values.

* * * * *